Oct. 9, 1923.

J. A. BOWDEN

DUST CAP SPRING

Original Filed Oct. 8, 1920

1,469,880

INVENTOR
Junius A. Bowden

Patented Oct. 9, 1923.

1,469,880

UNITED STATES PATENT OFFICE.

JUNIUS A. BOWDEN, OF LOS ANGELES, CALIFORNIA, ASSIGNOR TO A. SCHRADER'S SON, INCORPORATED, OF BROOKLYN, NEW YORK, A CORPORATION OF NEW YORK.

DUST-CAP SPRING.

Application filed October 8, 1920, Serial No. 415,655. Renewed March 6, 1923.

*To all whom it may concern:*

Be it known that I, JUNIUS A. BOWDEN, a citizen of the United States, residing at Los Angeles, in the county of Los Angeles, State of California, have invented new and useful Improvements in Dust-Cap Springs, of which the following is a specification.

This invention relates to quick detachable dust caps for tire valve stems.

The main object of the invention is to provide a spring band of irregular shape that will give the maximum efficiency of spring action circumferentially.

Another object is to provide a spring for a dust cap having numerous longitudinal projecting surfaces adapted to slidably engage the threads of the main body portion of the tire valve stem.

Other objects of the invention will be brought out in the foregoing specification and appended claims.

Figure 1:
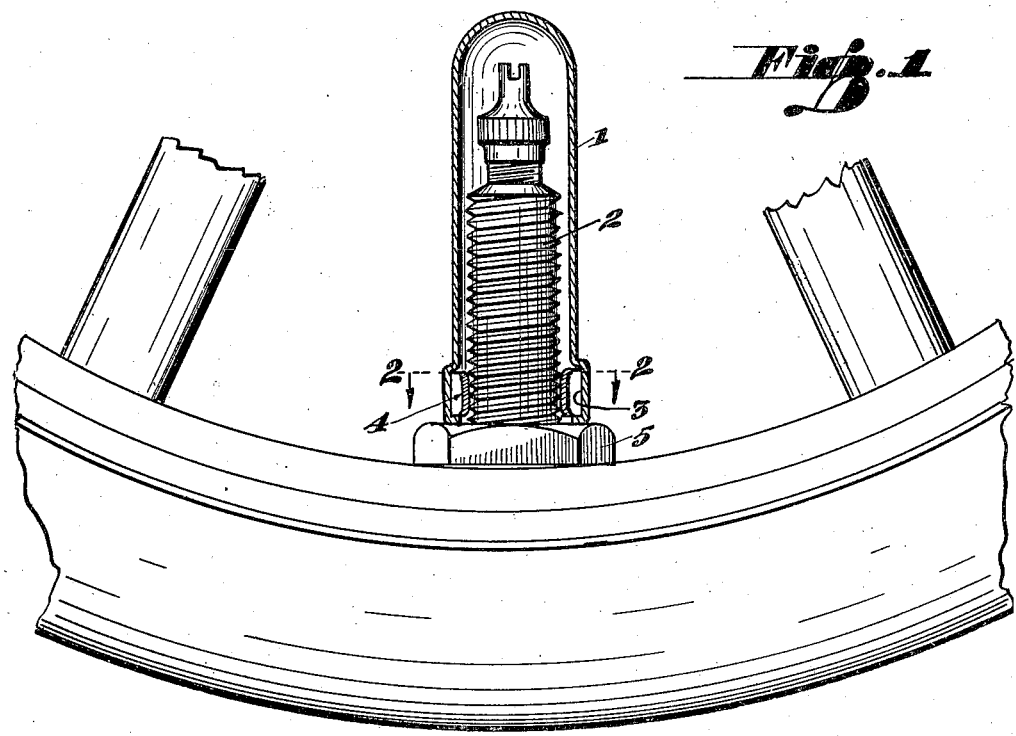
Figure 2:
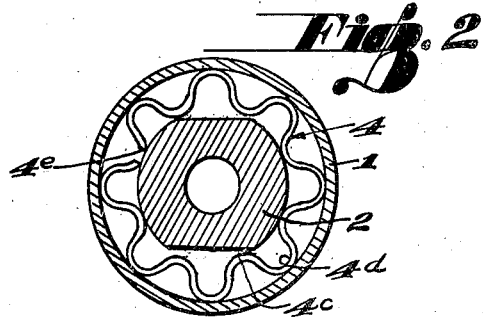
Figure 3:
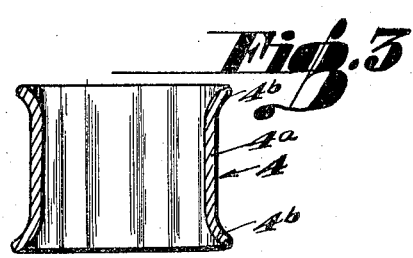
Figure 4:
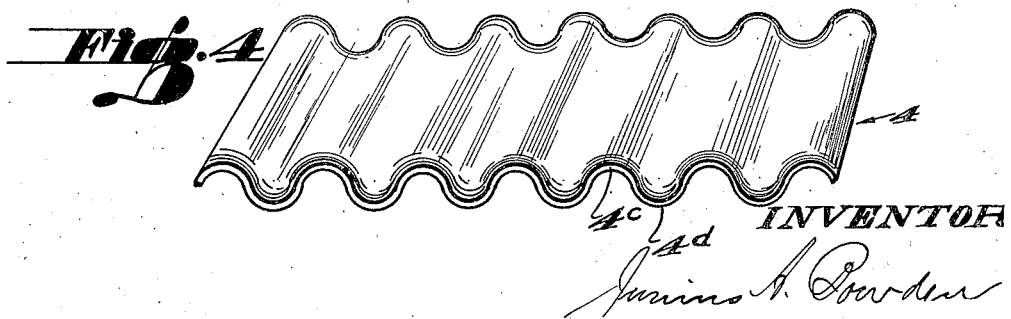

Referring to the drawings: Fig. 1 shows a front elevation in section of my dust cap and spring installed therein, mounted upon the threads of a tire valve stem, in connection with the tire. Fig. 2 is a cross section at 2—2 of Fig. 1, and shows an inwardly projecting surface $4^c$, and an outwardly projecting surface $4^d$, these projections run longitudinally and at $4^e$ shows the spring split. Fig. 3 shows a diametrical section of the spring with its outwardly flaring ends. Fig. 4 shows the spring in one form, shaped with the projecting surfaces $4^c$ and $4^d$, preparatory to being made round.

The novel spring 4, shown in this application is exceedingly simple, inexpensive to make and is very substantial. The construction provides for numerous projecting, longitudinal, bearing surfaces, $4^c$ on one side and $4^d$ on the other side, spaced apart and alternating with each other.

This construction affords liberal spring action, circumferentially, which takes place when pressure is exerted upon the projecting surfaces, which will take place when mounting the cap with the spring installed upon a tire valve stem and by this means hold the cap mounted upon the threads of the stem. The inwardly projecting surfaces $4^c$ do not engage the flat surfaces of the tire valve. The cap may be installed in any position regardless of the flat surfaces of the valve stem, in this respect my improved spring differs from my pending application, Serial No. 364430.

I do not limit myself to the specific construction shown. It is evident that longitudinal bearing surfaces could be formed on a band to operate in the same manner and yet the band with these projecting bearing surfaces could be spaced differently or formed differently, and effect the same result which is entirely within the scope of my invention.

Having described my invention, what I claim is:

1. A quick detachable dust cap in combination with a tire valve stem having external threads on its main body part, a band like spring adapted to be inserted in the dust cap forming a unit of the cap and spring, and said spring having numerous longitudinal inwardly projecting surfaces, adapted to slidably engage said threads in spring tight connection.

2. In a quick detachable dust cap for exteriorly threaded tire valve stems, a spring adapted to be inserted in said cap forming a unit of the spring and cap, said spring formed with numerous inwardly projecting longitudinal surfaces, and formed with numerous outwardly projecting surfaces, said inwardly projecting surfaces adapted to slidably engage the threads of said stem in spring tight connection, and the outwardly projecting surfaces adapted to engage the inner walls of said cap.

3. In quick detachable dust caps for exteriorly threaded tire valve stems, a spring adapted to be inserted in said cap forming a unit of the spring and cap, said spring formed with numerous inwardly projecting longitudinal surfaces, and formed with numerous outwardly projecting surfaces, said inwardly projecting surfaces adapted to slidably engage the threads of said stem in spring tight connection, and the outwardly projecting surfaces adapted to engage the inner walls of said cap, said spring having its upper end and its lower end flared outwardly.

4. In a dust cap for valve stems, an insertable spring band, said band formed with a series of projections on each side thereof, one of said series arranged staggeringly of the other series, one series adapted to engage the valve stem and the other series adapted to engage the cap.

5. In a dust cap for valve stems, an insertable spring band, said band formed with a series of longitudinal projections on each side thereof, one of said series arranged staggeringly of the other series, one series adapted to engage the valve stem and the other series adapted to engage the cap.

6. A dust cap provided with a spring band for engaging a valve stem, said band formed with a series of projections upon each side, the projections of one side arranged alternately of the projections on the opposite side, one of said series adapted to slidably engage the said stem longitudinally and the other series adapted to engage and move circumferentially upon the inner wall of the cap.

In testimony whereof, I have hereunto set my hand, at Los Angeles, California, this 30th day of September, 1920.

JUNIUS A. BOWDEN.